United States Patent [19]

Magarian

[11] 4,253,894
[45] Mar. 3, 1981

[54] DELIVERING ROVING FOR FABRICATION OF PLASTIC PIPE

[75] Inventor: Gerald M. Magarian, Long Beach, Calif.

[73] Assignee: Ameron, Inc., Monterey Park, Calif.

[21] Appl. No.: 900,735

[22] Filed: Apr. 27, 1978

[51] Int. Cl.³ ............................................. B65H 81/00
[52] U.S. Cl. .................................... 156/175; 156/425; 242/7.22; 242/157.1
[58] Field of Search ............... 156/169, 172, 173, 175, 156/184, 187, 425, 431, 428, 429, 430; 242/7.02, 7.21, 7.22, 7.23, 158 B, 157.1

[56] References Cited

U.S. PATENT DOCUMENTS

| | | | |
|---|---|---|---|
| 3,025,205 | 3/1962 | Young | 156/169 |
| 3,146,962 | 9/1964 | Hardwick | 242/158 B |
| 3,363,849 | 1/1968 | McLarty | 242/7.21 |
| 3,492,187 | 1/1970 | Hirtzen | 156/429 |
| 3,499,815 | 3/1970 | Hof | 156/431 |
| 3,519,520 | 12/1970 | Newman, Jr. | 156/431 |
| 3,616,063 | 10/1971 | Bradley | 156/425 |

*Primary Examiner*—Michael W. Ball
*Attorney, Agent, or Firm*—Christie, Parker & Hale

[57] ABSTRACT

Plastic pipe reinforced with rovings is produced by wetting the rovings with liquid resin and winding the wetted rovings onto a rotating mandrel from a carriage that moves to and fro along the length of the mandrel. The rovings are drawn onto the mandrel over a concavely arched surface mounted on the carriage. As the carriage reverses its direction at each end of the mandrel, the tilt of the concavely arched surface with respect to the carriage also reverses so the rovings always pass over the same section of the concavely arched surface. Apparatus for practicing this process is described.

19 Claims, 10 Drawing Figures

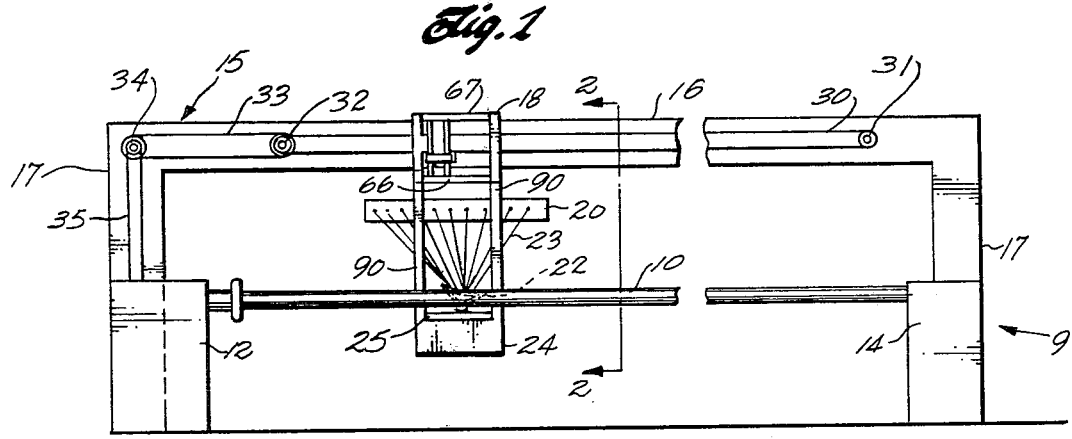
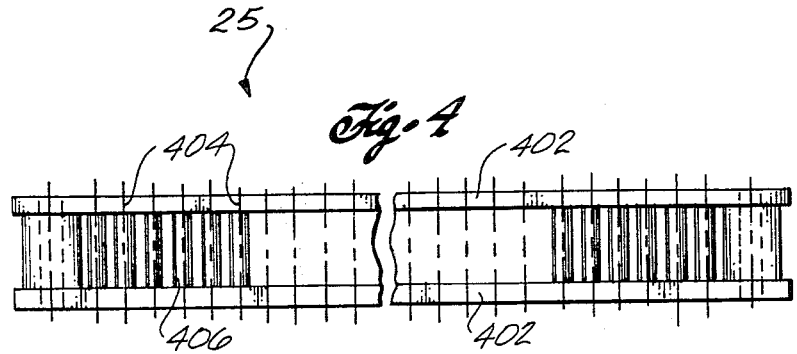

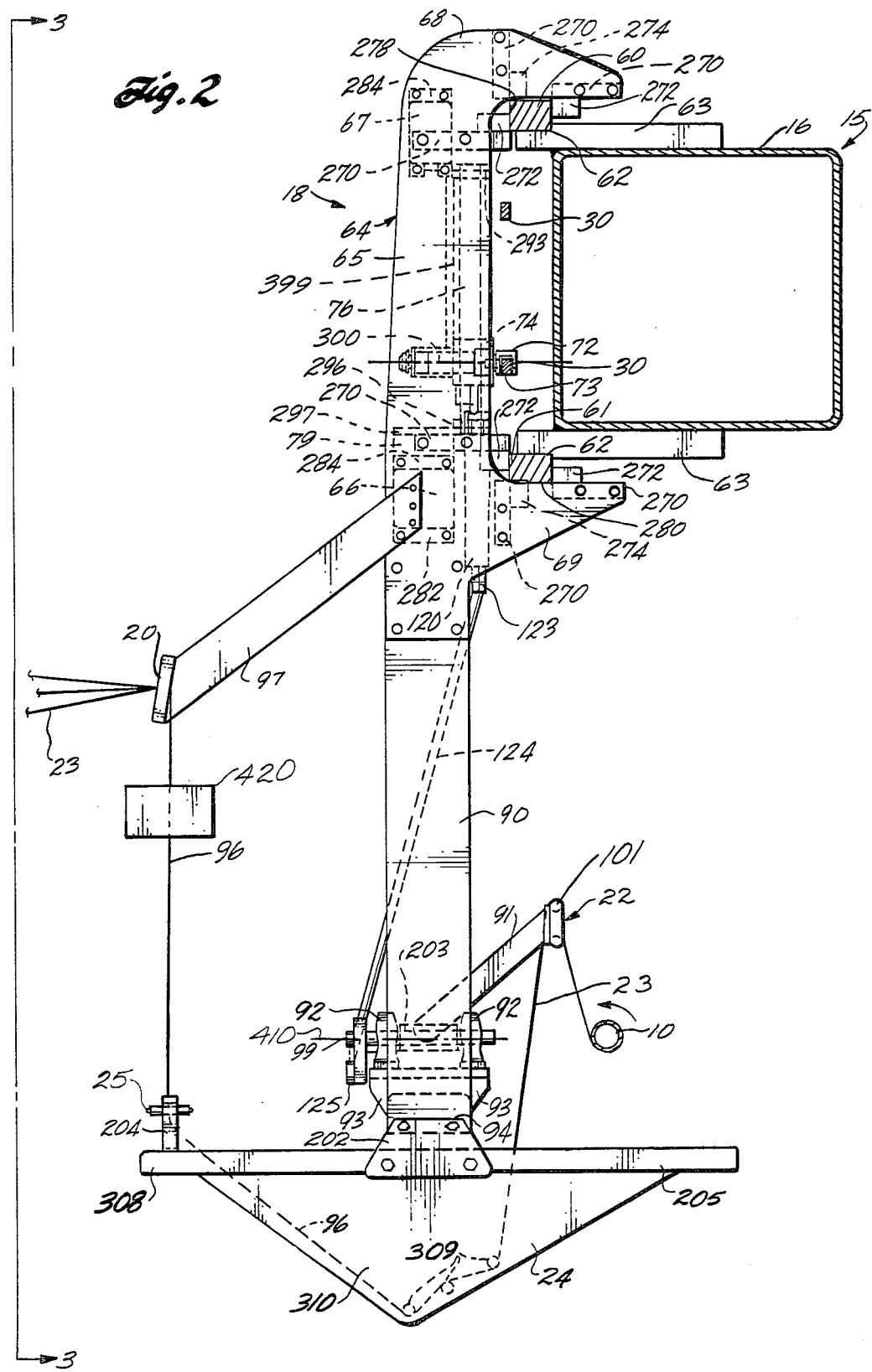

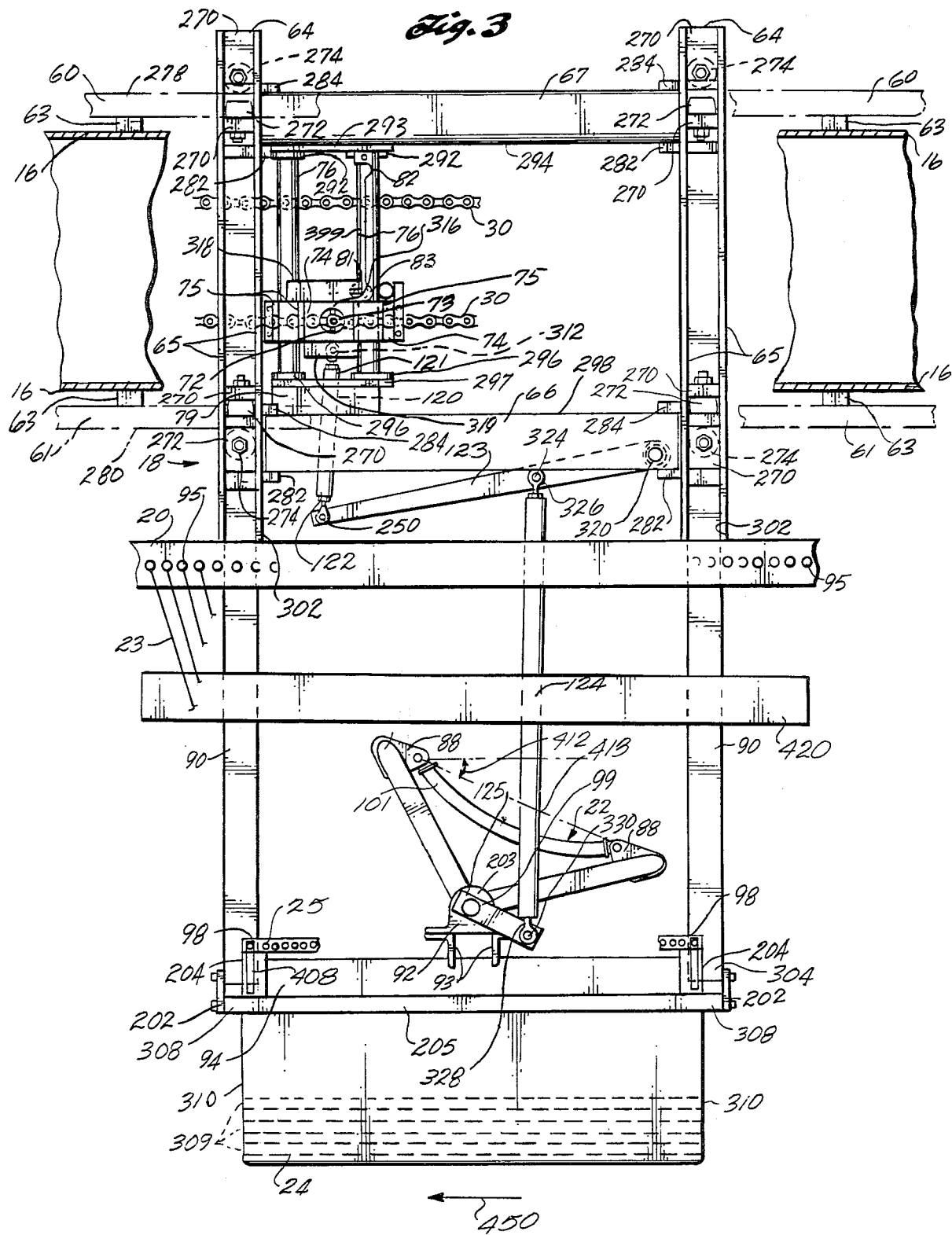

START OF REVERSAL

HALF WAY THROUGH REVERSAL
(.6 MANDREL REVOLUTION BEYOND FIG. 8)

END OF REVERSAL
(1.2 MANDREL REVOLUTIONS BEYOND FIG. 8)

DELIVERING ROVING FOR FABRICATION OF PLASTIC PIPE

BACKGROUND

In manufacturing reinforced plastic pipe by the wet winding process, a number of rovings or filament bundles are drawn through liquid resin, collected into a band, and wound onto a rotating mandrel. The winding path is usually a simple helix at an angle of approximately 55° to the mandrel axis of rotation. A uniformly reinforced pipe wall is formed by depositing the band of rovings wound in such a helix, first to the right along the mandrel and then to the left.

The economics of the winding process tend to improve as the number of rovings in the band is increased. However, if the added rovings are used to make the band thicker, several problems can be concountered, especially in small pipe with relatively thin walls. For example, it is more difficult to make a pipe wall of uniform thickness and good appearance when a thick, relatively narrow band is used. Also, the structural discontinuities created where thick bands cross each other within the wall tend to reduce the cyclic pressure resistance of the pipe. For these and other reasons, excessively thick bands tend to produce an inferior product. It is therefore preferable in most cases to increase the width of the band rather than its thickness to accommodate more rovings.

A number of methods for saturating rovings with liquid resin and collecting them into a band are in common use. Most of these methods fall into one of two categories: a "wet comb" method and a "dry comb" method. In both of these categoreis the same basic technique is used to form the band. This technique consists of using a comb or equivalent structure placed transverse to the path of the rovings to space the rovings uniformly along a straight line, and a concavely curved bar over which the rovings are drawn onto the mandrel. It is contact with the concave side of the curved bar that gathers the rovings into a uniform band. In the dry comb version of this technique, the rovings pass through the comb first, then through the resin bath and finally over the curved bar onto the mandrel. In the wet comb variant, the rovings are drawn through the resin bath first and subsequently through the comb and over the bar. When the wet comb method is used, the comb can be as close to the curved bar as desired since the resin bath is placed ahead of the comb. With the comb close to the bar, the rovings can be made to converge sharply to the curved bar and the bar can be strongly curved. When the spacing between the bar and the comb and the curvature of the bar are skillfully combined, the band can be tightly controlled. For example, the width of the band will change very little during carriage reversals and the band will quickly settle into its new position on the curved bar once the reversal is completed. Therefore, deviations from the desired helical winding angle and band width caused by carriage reversals are limited to very short sections at each end of the pipe.

A disadvantage of the wet comb method is the tendency of the comb itself to produce tangles. This characteristic is a result of small bundles of broken fibers within individual rovings. While rovings containing such flaws pass quite reliably through a comb structure when they are dry, they frequently tangle once they are wet. When the number of rovings used is large, and the product rate of the winding machine is high, work stoppages due to roving tangles can be costly.

Hirtzer in U.S. Pat. No. 3,492,187 describes a wet roving filament winding mechanism. Hirtzer's mechanism includes a resin pot, three combs, and delivery bar sequentially positioned with the added feature of pivoting the comb and delivery bar about a vertical axis to further improve control over the band when the winding helix reverses. However, even with this added feature, tangling and breaking of fibers can still occur at the wet combs. If Hirtzer's three comb mechanism is used with a large number of rovings, say, 50 to 100, excessive tangling of fibers would be inevitable.

Compared to the wet comb method, the dry comb system is highly reliable. Its primary disadvantage is the relatively poor band control it affords. This deficiency is due to the larger distance between the comb and the bar that is necessary to make room for the resin bath. Because of the extra distance, the rovings cannot be made to converge as sharply from the comb into the bar and so the bar cannot be strongly curved. If a wide band is desired, the curvature of the bar must be reduced still more. As a result, the band usually widens during carriage reversals and it must move a considerable distance along the gently curved bar to reach its new equilibrium position. But most important, the band is slow to reach its equilibrium width and location on the bar after a carriage reversal so a significant amount of material is wound at an incorrect band width and helix angle at each end of the mandrel. It is necessary to cut off and discard some of the incorrect windings at each end of the pipe if a high quality product is required. This extra trim loss can reach 5% or more of the total pipe length so it is a significant consideration.

In order to utilize the dry comb process to obtain reliability without sacrificing control when the helix reverses, one solution suggested is a tightly curved delivery bar such as a toroidal delivery ring as taught by Young in U.S. Pat. No. 3,025,205. However, the highly curved bar permits only relatively narrow bands to be wound around the mandrel, thereby adversely affecting the economics of the process.

Another method suggested for good control when the helix reverses is described by Hoff in U.S. Pat. No. 3,499,815. Hoff teaches the use of a horizontally oriented bar which pivots on a vertical axis for delivery of rovings to a horizontal mandrel. With this arrangement the width and thickness of the band are relatively unstable because the rovings tend to slide across the surface of the bar. In addition, the desired helix angle is not restored quickly because of a large distance between the comb and the mandrel.

Therefore, in the wet winding process, there is need for a reliable method and apparatus for forming a wide band of uniformly spaced rovings and winding them on a mandrel in a manner that limits deviations from the desired winding pattern to very short lengths at each end of the mandrel.

SUMMARY OF THE INVENTION

I have now invented a method and apparatus having the above features. According to my method, plastic pipe reinforced with rovings is manufactured by wetting a plurality of rovings with liquid resin and longitudinally carrying the wetted rovings to and fro along a rotating mandrel, which can be substantially horizontally oriented. The wetted rovings are delivered to the rotating mandrel as a band by passing the wetted rovings over a concavely arched surface, the surface being tilted longitudinally toward the direction of longitudinal movement of the rovings along the mandrel. The amount of tilt of the surface is sufficient to keep the band of rovings centered on the surface. When the rovings reverse their direction of movement along the mandrel, the tilt of the concavely arched surface also reverses in order to keep the band of rovings centered on the arched surface. Because the band is not required to change its position on the concavely arched surface, it does not widen during reversals and the helix angle at which the band is wound on the mandrel is substantially undisturbed beyond the immediate carriage reversal zone. The band of wetted rovings is helically wound on the mandrel at a selected helix angle, where the combination of the longitudinal movement of the rovings and the rotation of the mandrel produces the helix.

Apparatus for producing plastic pipe according to this method includes means for wetting the rovings, a carriage for longitudinally carrying the wetted rovings along the rotating mandrel, and the concavely arched surface. For optimum control of the band width, preferably the concavely arched surface tilts about an axis which is (a) substantially coplanar with or below the axis of rotation of the mandrel;

(b) substantially perpendicular to the axis of rotation of the mandrel, and (c) substantially perpendicular to the plane formed by the band of rovings as the band is delivered from the concavely arched surface to the mandrel.

Preferred apparatus for tilting the concavely arched surface comprises means for reciprocatingly pulling the carriage along the length of the mandrel, where the pulling means travels in a closed loop. A block is secured to the pulling means, where the block travels in a direction transverse to the direction of longitudinal movement of the carriage when the pulling means changes its direction of movement at the ends of the closed loop. There are linkage means connecting the concavely arched surface to the block, where when the block travels transversely to the longitudinal movement of the carriage because the pulling means changes its direction of movement, the linkage means forces the concavely arched surface to reverse its tilt.

DRAWINGS

These and other features, aspects and advantages of the present invention will become more apparent with respect to the following description of the invention, appended claims, and accompanying drawings where:

FIG. 1 is a side elevation view of a pipe making machine showing the general relationship of the components of the machine;

FIG. 2 is a view taken on line 2—2 of FIG. 1 of the roving carriage assembly;

FIG. 3 is a view in partial section taken on line 3—3 of FIG. 2 of the roving carriage assembly;

FIG. 4 is a top view of the comb of the roving carriage assembly;

Figure 8:
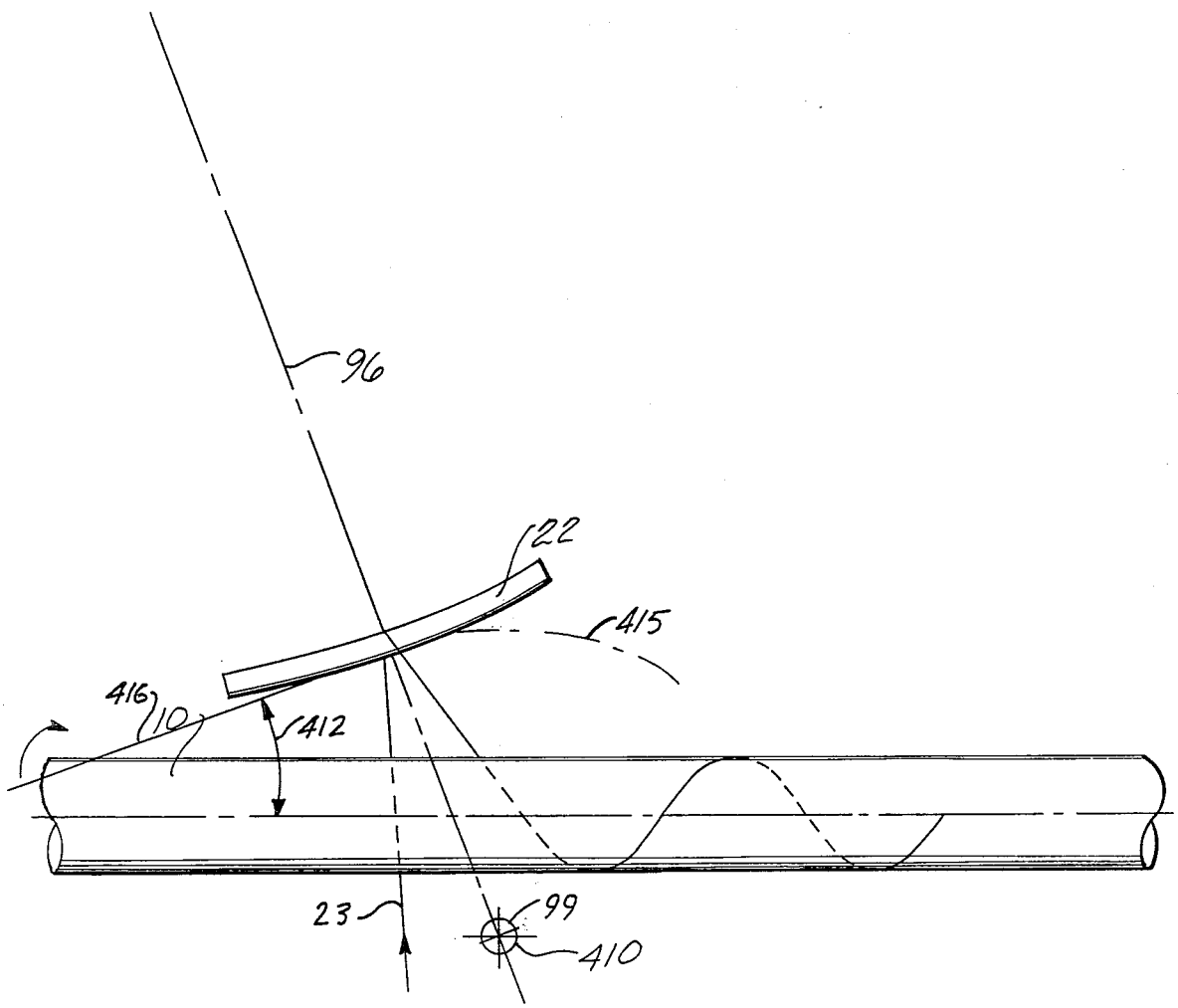
Figure 9:
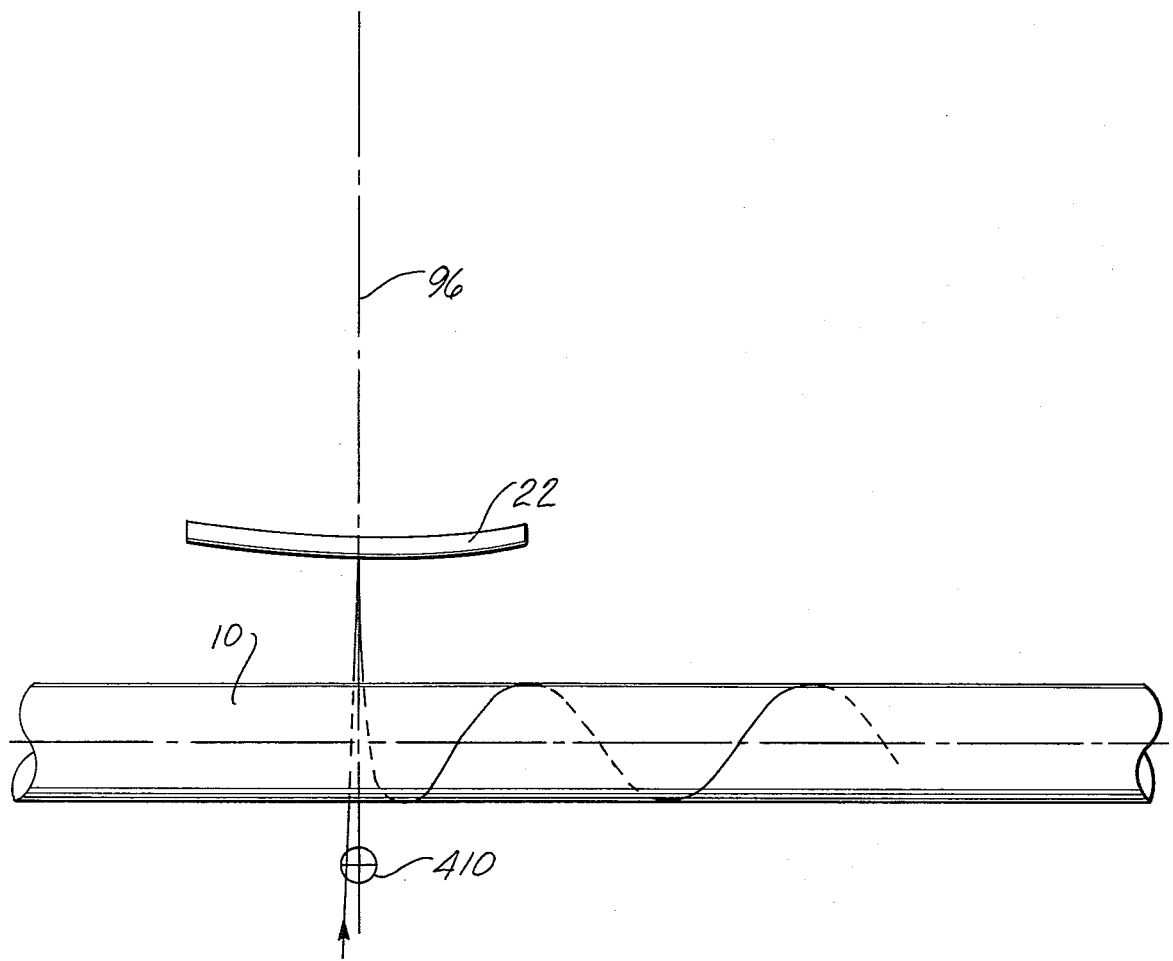
Figure 10:
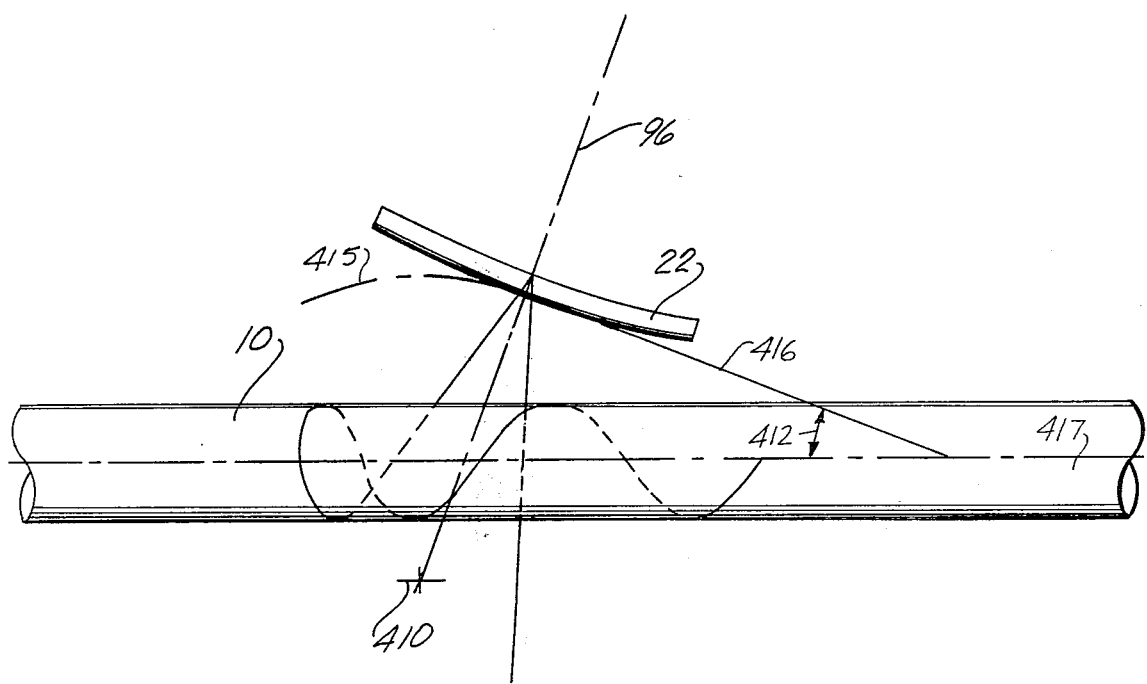

FIGS. 8–10 schematically show the relationship between a tilting bar, rovings and a mandrel at the start of, during, and after a carriage reversal, respectively.

DETAILED DESCRIPTION OF THE INVENTION

Referring to FIG. 1, a pipe making machine 9 includes an elongated, horizontal, rotatable mandrel 10 journaled at one end in a headstock assembly 12. An upright frame 15 includes an elongated, horizontal box girder 16 supported at its ends above the mandrel by respective vertical legs 17 mounted on the tail stock and head stock assemblies. A roving carriage assembly 18, which travels to and fro along the box girder 16, includes a bushing board 20 and a delivery ring 22 for applying rovings 23 wetted with liquid resin in a resin pot 24 in accordance with principles of this invention.

The rovings 23 with which this invention is useful are composed of substantially continuous, unidirectional fibers or filaments, and may take the form of mineral fibers such as glass or asbestos; animal fibers such as wool; vegetable fibers such as cotton; synthetic fibers such as nylon, rayon, Dacron, Orlon; and the like.

The resin or adhesive used to impregnate and wet the rovings 23 can be any thermosetting or thermoplastic resin used in winding or laminating procedures. For example, this invention is useful with binders containing a thermosetting resin such as epoxy, polyester, melamineformaldehyde, urea-formaldehyde, phenolformaldehyde, or the like, or binders containing a thermoplastic resin such as polyvinyl chloride, polyvinylidene chloride, or the like.

The headstock assembly 12 comprises a conventional rotatable drive means (not shown) for rotating the mandrel 10 at a predetermined rate in coordination with the longitudinal rate of travel of the roving carriage assembly 18. The roving carriage assembly is pulled longitudinally by a first continuous drive chain 30 which travels over an end sprocket 31 and a first end sprocket assembly 32 consisting of two sprockets mounted on a single stub shaft, both of which are attached to the elongated frame 16. The drive chain 30 is driven by a second, horizontally oriented, continuous drive chain 33 which travels over the first end sprocket assembly 32 and a second end sprocket assembly 34 consisting of two sprockets mounted on a single stub shaft which is pulled by a vertically oriented continuous drive chain 35 powered by the rotatable drive means which rotates the mandrel, thereby ensuring that the movements of the mandrel and the roving carriage assembly are coordinated.

With reference to FIGS. 2 and 3, the box girder 16, along which the roving carriage assembly 18 travels, supports a pair of elongated, vertically-spaced apart horizontal rails, a top rail 60 and a bottom rail 61, each of which is welded to and carried in notches 62 of a plurality of cross bars 63 welded to the box girder 16.

The roving carriage assembly 18 comprises two C-shaped, vertically oriented frame members 64 each formed by a pair of parallel, spaced-apart, C-shaped plates 65.

Bolted between each pair of C-shaped plates 65 are six roller support plates 270 (a total of 12) which serve to keep each C-shaped plate 65 apart from the corresponding C-shaped plate. Each roller support plate also serves to support one of twelve rollers 272, 274 which enable the roller carriage assembly to travel along the rails 60, 61. The roller support plates are positioned so that each C-shaped frame member 64 has six rollers, a top set of three rollers which engages the top rail 60 and a bottom set of three rollers which engages the bottom rail 61. For each set of rollers, one side roller 272 rolls along one side of a rail, a second side roller 272 rolls along the opposite side of a rail, and the third roller 274 engages the top 278 of the top rail 60 in the case of the top set of rollers or the bottom 280 of the bottom rail 61 in the case of the bottom set of rollers.

The C-shaped frame members 64 are held spaced apart by two parallel, elongated, support beams, a lower beam 66 and an upper beam 67, the ends 280 of which are supported by two support blocks 282, 284 bolted to the inner C-shaped plates, one 282 below and one 284 above each beam 66, 67. The upper 68 and lower 69 arms of the C-shaped frame members 64 extend over and under, respectively, the horizontal box girder 16.

The roving carriage assembly, which is pulled by a chain drive 30, is attached to the chain drive 30 by a U-shaped fastener 72, which grips a chain link on both sides. A cylindrical pin 73 is inserted through the chain link and both arms of the fastener. The fastener is mounted to rotate around a horizontal transverse axis 300 in a block 74. As the chain is pulled over sprockets 31, 32 at the ends of the box girder 16, only the chain fastener rotates thereby permitting the remainder of the roving carriage assembly to maintain its orientation with respect to the mandrel.

The block 74 consists of a central block 316 in which the fastener is mounted and two smaller blocks 318, 319 welded to the top of and bottom of the central block 316, respectively.

As the chain drive pulls the carriage 18 along the rails, the chain reverses its direction of travel around the end sprockets 31, 32. The block 74 is slidably mounted with ball bushings 75 on cylindrical, vertical guide rods 76 to insulate the carriage from the vertical motion of the chain at the end sprockets. Each guide rod 76 is mounted in two collars, one 292 attached to a flat horizontal plate 293 welded to the underside 294 of the upper support beam 67 and another 296 attached to a flat horizontal plate 297 welded to a block 79 on the top side 298 of the lower support beam 66.

The block 74 is shown in FIGS. 2 and 3 in the position it occupies as it is pulled by a chain link traveling along the lower portion of the drive chain path. As the link moves around an end sprocket the link is pulled upward by the chain. The block 74, which is mounted to slide on the guide rods 76, follows the path of the link without affecting the orientation of the rest of the roving carriage assembly.

The block 74 undergoes a sinusoidal vertical acceleration relative to the carriage and travels in a simple circular arc relative to the mandrel as the chain link to which it is connected travels the first 90° around the end sprocket. It then decelerates to rest at its opposite extreme position on guide bars 76 as the chain link completes its last 90° of travel around the sprocket. A cam roller 81 attached to the block 74 is spring-loaded to engage a detent 82 at the top of a detent bar 399 when the block 74 is in its uppermost position, and a lower detent 83 in the detent bar 399 when the block is at its bottom position as shown in FIG. 3. Because the block is rigidly held in a detent, slack in the chain does not affect the position of the block. Only the forces at the end sprockets where the carriage reverses direction are sufficiently large to disengage the spring-loaded cam roller 81 from the detents. Therefore, the relative position between the rovings and mandrel remains essentially unchanged as the roving carriage assembly is pulled along the box girder 16, thereby ensuring uniform winding of the rovings around the mandrel.

An elongated column 90 is sandwiched between and bolted to the bottom portion 302 of each pair of C-shaped plates 65. The columns 90 support the apparatuses used for coating and feeding the rovings, including the delivery ring 22, resin pot 24, and comb 25. Suspended from a pair of vertically oriented plates 202, one of which is attached to the bottom portion 304 of each of the columns 90, is the trough shaped resin pot 24 which holds the resin used for coating the rovings. The resin pot has a rim 205 projecting outwards at the top of the pot, the rim being bolted to the plate 202. The delivery ring 22 comprises a uniformly curved, concavely arched, smooth-surfaced round bar 101 bolted at both ends to ears 88 welded to a V-shaped frame member 91 which is welded at the apex to an enlarged portion 203 of a horizontal shaft 99 which extends toward the mandrel and is mounted in pillow blocks 92. The pillow blocks 92 are supported by angle irons 93 attached to a horizontal cross-beam 94 bolted to and extending between the bottoms of the tubular columns 90.

The rovings 23 to be impregnated with resin are pulled through a bushing board 20, which is a flat, elongated, horizontal board with a plurality of holes 95. A single strand of roving is pulled through each hole 95. The path of the rovings is shown by line 96 in FIG. 2. The bushing board 20 is suspended from a pair of struts 97, one of which is bolted to and projects from each of the outer C-shaped plates 65. The rovings are then drawn through an elongated horizontal comb 98 which is parallel to and positioned below the bushing board and mounted in supports 204 welded to the corners 308 of the rim 205 of the resin pot 24 below the bushing board 20. The comb spaces the rovings properly as they enter the resin pot 24.

With reference to FIG. 4, the comb comprises two elongated, spaced apart, parallel bars 402, each having a plurality of holes 404, each being aligned with a corresponding hole in the other bar. Spring pins 406 are mounted in all the holes except the endmost holes, the spring pins serving as the "teeth" of the comb, the spring pins being crosswise to the bars 402. The endmost holes are used for mounting the comb in the supports 204. Each support 204 has a vertical slot 408 in which the comb is mounted. The comb can be raised or lowered in these slots to vary the distance between the comb and the bushing board for changing the width of the band formed.

Next, the rovings pass alternately over and under a series of three horizontal, cylindrical bars which are generally parallel with the comb and are welded to the bottom portion of opposing walls 310 of the resin bath 24 to become coated with resin. In the bath the rovings converge toward the concave surface where they join to form a band. The resin coated rovings are then pulled over the concave surface of the curved delivery ring 101, which provides a smooth concavely arched surface for the rovings, and then are helically wound about the rotating mandrel 10, the helix being formed by the combination of the rotation of the mandrel and the lateral movement of the roving carriage assembly. Preferably the helix angle is about 55 degrees to provide optimum strength to the reinforced plastic pipe.

In order to restore the helix angle as quickly as possible after the carriage assembly reverses its direction of movement, the delivery ring tilts. The means for tilting the delivery ring when the roving carriage assembly reverses its direction of longitudinal movement along the mandrel is most clearly shown in FIGS. 2 and 3. As the block 74 slides down the guide rods 76 to the position it occupies shown in FIG. 3 as the chain linkage to which the block is attached travels around an end sprocket, a vertically oriented link 120, the top end 121 of which is pivoted on a horizontal pin 312 projecting out of the bottom block 319 of the block 316, is forced downward. Mounted on a pivot shaft 250 projecting through the bottom end 122 of the rod 120 is one end of a horizontally oriented lever 123, the opposite end of which is pivotally mounted on a pin 320 projecting horizontally from the lower elongated beam 66. As the block 74 slides downward, the lever 123 pivots downward to the position shown in FIG. 3. Attached to a pin 324 projecting from the mid-section of the lever 123 is a male rod end 326 attached to an elongated, vertically oriented link 124 which mimics the up and down motion of the block. At the opposite end of the link 124 is another male rod end 328 mounted on a pin 330 attached to a crank 125 which is secured to the pivot shaft 99 of the V-shaped frame 91 supporting the curved bar 101 of the delivery ring 22.

In operation, when the block 74 rises to its uppermost position, the link 120, the lever 123, and the link 124 attached to the crank 125 are pulled upward. This tilts the delivery ring 22 toward the left side. Therefore, as the roving carriage assembly changes directions as it moves to and fro along the mandrel, the delivery ring reverses its tilt so it continues to tilt toward the direction of movement of the carriage assembly.

Successful operation of the tilting delivery ring requires that it be tilted about an axis that is substantially perpendicular to both the mandrel axis of rotation and the plane of the roving band where it passes from the delivery ring to the mandrel. It is believed that only when the tilting axis fails to be perpendicular to the plane of the band by more than 30° will unsatisfactory helix reversals result.

Figure 5:
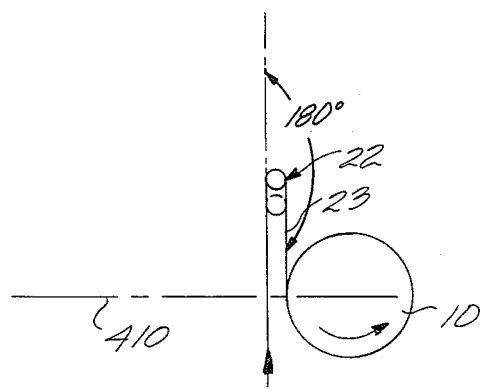
FIGS. 5 and 6 are schematic end views of a mandrel, curved bar and a band of rovings being drawn over the bar and wound onto the mandrel.
Figure 6:
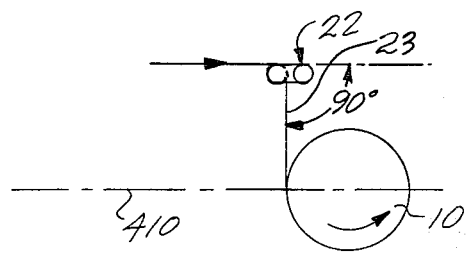

The tilt axis 410 of the ring can pass through the mandrel axis, or pass well below it, or any place between. Thus, the tilt axis is in a plane at an elevation no higher than the elevation of the mandrel axis. The exact location required for proper operation depends upon the kinematics of the linkage used to tilt the bar, the bar-to-mandrel distance, bar-to-axis distance, bar-to-comb distance, etc. The best location can easily be determined experimentally. The preferred orientation and position of the tilt axis 410 is shown in FIGS. 5 and 6. FIG. 5 shows a band deflected 180° over the delivery ring while FIG. 6 shows a 90° band deflection. In FIG. 6, the plane of the ring has been rotated 90° to conform to roving guiding principles that are widely known. FIGS. 5 and 6, for the purposes of exposition, represent the delivery bar as an idealized straight bar.

Figure 7:
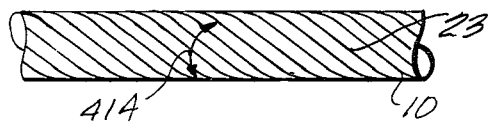
FIG. 7 shows rovings wrapped around a mandrel.

The amount the delivery ring should tilt, as indicated by angle 412 in FIG. 3, depends upon the helix angle of the pipe and the amount of angular deflection the band undergoes as it is drawn over the delivery ring. The "helix angle," which is represented by angle 414 in FIG. 7, is the angle between the rovings 23 and the longitudinal axis of the mandrel. The required tilt is the amount that makes the band stay centered on the ring.

It has been determined that the amount of tilt of the delivery ring is equal to a factor "a" multiplied by the difference between a right angle and the selected helix angle. Factor "a" ranges from about ½ to about 1, and depends upon the amount of angular deflection of the band at the ring. For example, with a deflection of 180°, "a" equals one half. For a deflection of 90°, "a" equals 1. Therefore, with a deflection of 180° and a helix angle 55°, the tilt angle is about 18° [0.5×(90°−55°)]. For a deflection of 90° and a helix angle of 54°, the tilt angle required is 36° [1×(90°−54°)].

The radius of curvature of bar 101 depends primarily upon the band width required, the comb width, the comb-to-bar path length, and the angular deflection of the band at the ring. It also depends upon the number of rovings used to the extent that they crowd each other, etc. Techniques for determining the required radius of curvature by a combination of graphical, analytical and experimental means are known. The larger the radius of curvature of the bar 101, the wider the band of rovings. Generally, the width of the band of rovings increases with the diameter of pipe being manufactured. A delivery bar 101 having a radius of 10 inches producing a band containing 72 fiberglass rovings of 450 yards per pound yield and having a width about 4 inches has successfully been used for manufacturing pipe 2, 4, and 6 inches diameter.

The principle of operation of the tilting ring 22 is illustrated in some detail in FIGS. 8, 9, and 10. The single roving 23 shown in FIGS. 8–10 represents the central roving of a wide band. All dimensions and conditions indicated in these three figures have been confirmed experimentally so they represent a workable combination.

While the combination shown is practical, it is quite sensitive and requires close adjustment of angles, etc. Therefore, it might be considered a fairly extreme combination of band width, comb width, bar-to-comb distance and bar curvature. The conditions illustrated are used to wind 3-inch pipe with a 6-inch wide band containing 72 rovings of 450 yd/lb yield. When 2-, 4- or 6-inch pipe are wound, the band is narrowed to a 4-inch width without removing any of the rovings. The more strongly curved bar used to form the 4-inch band makes the setup somewhat less critical of adjustments.

In FIG. 8 the tilting bar arrangement is shown at the start of a carriage reversal, that is, at the instant the chain link to which block 74 is connected arrives at the end sprocket. The roving angles of arrival and departure relative to the bar are equal, as they must be at steady-state, and the bar is tilted to an amount that keeps the roving centered on the bar. The bar pivots along an arc 415 about axis 410, which is below the mandrel. A straight line 416 tangent to the delivery ring where the central roving of the band passes over the concave surface of the ring extends toward the mandrel downwardly to the left (as viewed in FIG. 8), the direction in which the carriage and ring move the rovings relative to the mandrel before the carriage starts to reverse direction. The angle 412 between line 416 and the longitudinal axis 417 of the mandrel is the amount the delivery ring should tilt as described above with respect to FIG. 3 to wind the rovings around the mandrel at desired helix angle 414 shown in FIG. 7.

FIG. 9 shows conditions after the mandrel has turned another 0.6 revolution to bring the carriage reversal process to its half way point. The delivery ring 22 has pivoted on shaft 99 about axis 410 an amount equal to angle 412, and the roving is still centered on the bar.

FIG. 10 shows conditions after the mandrel has turned 1.2 revolutions to just complete the carriage reversal process. The roving is still centered, and the angles of arrival and departure relative to the bar are still equal, the tangent 416 makes an angle 412 with the mandrel longitudinal axis, and the roving is at the correct angle relative to the mandrel axis. Beyond this amount of rotation, the roving position and orientation relative to the bar and mandrel axis do not change until the carriage reaches the other end of the mandrel. And since the band is not required to shift along the bar, it does not widen during reversals. Therefore, the pattern is wound at essentially steady state conditions as soon as the carriage reversal is complete.

In a preferred version of this invention, heating means 420 are provided for heating the rovings before they pass into the resin bath. The heating means can be a carriage-mounted plenum supplied with hot air by a flexible duct. The purpose of the heater is to prevent the rovings, which in the absence of the heater would be at room temperature, from cooling heated resin in the resin bath to such a low temperature that plastic pipe cannot be produced at economical rates. For example, in the case of high viscosity epoxy resin, which are heated to facilitate processing, room temperature rovings can cool the resin in the resin bath 24 to such a low temperature that the resin becomes so viscous, it is difficult to pull the rovings through the resin, and the resin does not properly saturate the rovings.

Exemplary of use of this feature of this invention is production of plastic pipe with 72 rovings, the material being 450 yard per pound fiberglass, and an epoxy resin having a viscosity of 7,000 cps at room temperature. The epoxy resin is heated to a temperature of 135° F. and the rovings are preheated to a temperature of 120° F. The resin stabilizes in the resin pot at a temperature of 125° F. If the rovings were not preheated, the resin would cool to a temperature of less than 100° F. in the resin pot and reduction in production rates due to difficulty in impregnating the rovings with the high viscosity resin would result.

The method of this invention has significant advantages over prior art methods for preparing plastic pipe by wrapping resin impregnated rovings around a mandrel. Among these advantages is less wastage of raw materials due to improper helix angle at the ends of the plastic pipe form. It has been found that a delivery ring which tilts keeps pipe end trim losses to a minimum while retaining the high reliability of the dry comb method. Because of this, trim losses are now less than 50% of their previous value. In addition, wide bands of rovings can be used, without fear of wastage at the ends of the pipe, thereby resulting in significantly increased production rates.

In summary, this invention combines the highly reliable roving handling characteristics of the dry comb method with the wide band capability of the wet comb method. Specifically, it can reliably form and deliver a wide band yet maintain accurate band width and helix angle in the windings immediately following carriage reversals. The advantage of the high reliability is a higher average production rate.

Good pattern control in the windings immediately following carriage reversals holds the amount of material that must be trimmed off the end of a pipe to the minimum possible for the band width used.

The tilting bar method maintains control of the band pattern in the critical post-reversal period by keeping the band always centered on the delivery bar. It does this by tilting the bar toward the direction of carriage travel by the necessary amount and reversing this tilt as the carriage reverses. Because the band does not shift along the bar during and immediately after reversals, it does not widen. Furthermore, since the band is at its steady-state position (centered) and width the moment a reversal is completed, the winding pattern is very nearly correct the instant the reversal is complete. Therefore, significant deviations from the desired winding pattern are confined to the immediate reversal zone so end trim losses are minimized.

This invention has been described with reference to preferred embodiments. However, other embodiments of the invention are useful for practicing the invention. For example, this invention may be used not only in a single mandrel pipe making machine, but also in multi-mandrel pipe machines such as the merry-go-round type configuration shown in FIG. 17 of the U.S. Pat. No. 3,616,063, or where the mandrels are mounted on a single frame in a ferris wheel type configuration, as described in my copending U.S. Patent Application, Ser. No. 824,494, filed on Aug. 5, 1977, and incorporated herein by this reference.

Because of variations such as these, the spirit and scope of the appended claims should not be necessarily limited to the description of the preferred embodiments contained herein.

It is claimed:

1. A method for manufacturing plastic pipe reinforced with rovings comprising the steps of:
    (a) wetting a plurality of rovings with liquid resin;
    (b) longitudinally carrying the wetted rovings to and fro on a carriage along a mandrel rotating about its longitudinal axis;
    (c) delivering the wetted rovings in a band to the rotating mandrel by sliding them over an elongated surface which moves with the carriage and which is spaced from and curved concavely away from the mandrel, the surface extending in the same general direction as the longitudinal axis of the mandrel;
    (d) disposing the surface so a tangent to the surface where the centerline of the rovings passes over the surface extends toward the mandrel in the direction in which the rovings move relative to the mandrel;
    (e) pivoting the surface about an axis spaced from the surface in the direction of the mandrel at least as far as the longitudinal axis of the mandrel as the rovings reverse their direction along the mandrel to shift the curved surface relative to the carriage and longitudinally relative to the mandrel axis to simultaneously tilt the surface so the tangent extends toward the mandrel in the new direction in which the rovings move relative to the mandrel and at substantially the same angle as when the rovings move in the other direction, the shifting and tilting being such that the band does not substantially shift along the surface and does not substantially widen during the carriage reversal; and
    (f) helically winding the band of wetting rovings on the mandrel at a selected helix angle, wherein the combination of the longitudinal movement of the rovings and the rotation of the mandrel produces a helix.

2. A method as claimed in claim 1 in which the surface pivots about an axis which is substantially coplanar with or beyond the axis of rotation of the mandrel.

3. A method as claimed in claim 2 in which the surface pivots about an axis which is in a plane substantially perpendicular to the axis of rotation of the mandrel.

4. A method as claimed in claim 1 in which the surface pivots about an axis transverse to the axis of rotation of the mandrel.

5. A method as claimed in claim 1 in which the surface is smooth.

6. A method as claimed in claim 1 in which the total angle through which the surface pivots is from about one-half to about one times the difference between a right angle and the selected helix angle.

7. A method as claimed in claim 1 in which the surface pivots about an axis substantially perpendicular to the plane formed by the band of rovings as the band is delivered from the surface to the mandrel.

8. A machine for manufacturing plastic pipe reinforced with rovings comprising:
   (a) a mandrel upon which the pipe is formed, the mandrel rotating about its longitudinal axis;
   (b) means for wetting a plurality of rovings with liquid resin;
   (c) means for carrying the wetted rovings in a band to and fro along the length of the mandrel as the band of wetted rovings are helically wound at a selected helix angle on the mandrel;
   (d) an elongated surface secured to the carrying means, the surface extending in the same general direction as the longitudinal axis of the mandrel and being spaced from and curved concavely away from the mandrel, and the surface being disposed so the wetted rovings pass over it and so a tangent to it where the centerline of the rovings passes over it extends toward the mandrel in the direction in which the rovings move relative to the mandrel; and
   (e) means for pivoting the surface about an axis spaced from the surface in the direction of the mandrel at least as far as the longitudinal axis of the mandrel and transverse to the longitudinal axis of rotation of the mandrel whenever the rovings reverse their direction of longitudinal movement along the mandrel to shift the surface relative to the carrying means and longitudinally relative to the mandrel axis to simultaneously tilt the tangent to the surface toward the mandrel in the direction of longitudinal movement of the rovings in order to maintain a substantially constant angle between the long axis of the rovings and the axis of rotation of the mandrel as the rovings are wound at the selected helix angle on the mandrel, and so that the band does not substantially shift on the surface and does not substantially widen during reversal of the carriage means.

9. A machine as claimed in claim 8 in which the surface is positioned between the wetting means and the rotating mandrel.

10. A machine as claimed in claim 8 in which the means for pivoting the surface comprises:
    (a) means for reciprocatingly pulling the carrying means along the length of the mandrel wherein the pulling means travels in a closed loop;
    (b) a block secured to the pulling means, wherein the block travels in a direction transverse to the direction of longitudinal movement of the carriage means when the pulling means changes its direction of movement at the end of the closed loop; and
    (c) linkage means connecting the surface to the block, wherein when the block travels in a direction transverse to the longitudinal movement of the carriage, the linkage means forces the surface to pivot.

11. A machine as claimed in claim 10 in which the pulling means is a chain link.

12. A machine as claimed in claim 8 in which the surface pivots about an axis substantially coplanar with or beyond the axis of rotation of the mandrel.

13. A machine as claimed in claim 8 in which the surface pivots about an axis which is in a plane substantially perpendicular to the axis of rotation of the mandrel.

14. A machine as claimed in claim 8 in which the angle through which the surface pivots is from about one-half to about one times the difference between a right angle and the selected helix angle.

15. A machine as claimed in claim 8 in which the surface of the surface over which the rovings pass is smooth.

16. A machine as claimed in claim 8 in which the surface pivots about an axis substantially perpendicular to the plane formed by the band of wetted rovings as said band passes from said surface to the mandrel.

17. A machine for manufacturing plastic pipe reinforced with rovings comprising:
    (a) a horizontally oriented mandrel upon which the pipe is formed, the mandrel rotating about its longitudinal axis;
    (b) comb means for spacing a plurality of rovings apart from each other;
    (c) means for wetting the spaced rovings with liquid resin;
    (d) carriage means for carrying the wetted rovings longitudinally to and fro along the length of the rotating mandrel for helically winding wetted rovings on the mandrel at a selected helix angle;
    (e) an elongated surface secured to the carriage means, the surface extending in the same general direction as the longitudinal axis of the mandrel and being spaced above and curved concavely away from the mandrel, and the surface being disposed so the wetted rovings pass over it and so a tangent to it where the centerline of the rovings passes over it extends toward the mandrel in the direction in which the rovings move relative to the mandrel, the surface collecting the wetted rovings into a band and delivering the band to the mandrel for winding the band on the mandrel at the selected helix angle; and
    (f) means for pivoting the surface about an axis in a plane which is substantially perpendicular to the axis of rotation of the mandrel and at an elevation no higher than the elevation of the longitudinal axis of rotation of the mandrel when the band of rovings reverses its direction of longitudinal movement along the mandrel to shift the curved surface relative to the carriage means and longitudinally relative to the mandrel axis to simultaneously tilt the surface so the tangent extends toward the mandrel in the new direction in which the rovings move relative to the mandrel and at substantially the same angle as when the rovings move in the other direction, and so the shifting and tilting is such that the band does not substantially shift along the surface and does not substantially widen during the carriage reversal.

18. A machine as claimed in claim 17 in which the surface pivots about an axis perpendicular to the plane formed by the band of wetted rovings as said band is delivered from said surface to the mandrel.

19. A machine as claimed in claim 17 in which the surface has a smooth surface over which the rovings pass.

* * * * *

UNITED STATES PATENT AND TRADEMARK OFFICE
CERTIFICATE OF CORRECTION

PATENT NO. : 4,253,894

DATED : March 3, 1981

INVENTOR(S) : GERALD M. MAGARIAN

It is certified that error appears in the above—identified patent and that said Letters Patent is hereby corrected as shown below:

Col. 1, line 18, "concountered" should read -- encountered --
Col. 6, line 59, after "ring" insert -- bar --
Col. 10, line 59 (Claim 1, line 32), "wetting" should read -- wetted --

Signed and Sealed this

Twenty-ninth Day of September 1981

[SEAL]

Attest:

Attesting Officer

GERALD J. MOSSINGHOFF

Commissioner of Patents and Trademarks